United States Patent [19]
Drumheller

[11] 3,805,171
[45] Apr. 16, 1974

[54] SIGNAL FREQUENCY DETECTION CIRCUIT

[75] Inventor: Ronald L. Drumheller, New York, N.Y.

[73] Assignee: Eastech, Inc., South Plainfield, N.J.

[22] Filed: July 12, 1972

[21] Appl. No.: 270,997

[52] U.S. Cl............... 328/140, 324/78 D, 328/116, 328/117, 328/152
[51] Int. Cl. ........................................... H03k 5/20
[58] Field of Search ........... 328/137, 140, 115, 116, 328/117, 152; 324/78 D

[56] References Cited
UNITED STATES PATENTS

| | | | |
|---|---|---|---|
| 3,069,631 | 12/1962 | Adams................................ | 328/137 |
| 3,112,452 | 11/1963 | Kirkpatrick...................... | 328/117 X |
| 3,371,225 | 2/1968 | Featherston.................... | 328/140 X |
| 3,529,248 | 9/1970 | Boelke............................... | 328/140 |
| 3,553,728 | 1/1971 | Frank et al. ...................... | 324/78 D |
| 3,638,037 | 1/1972 | McMurtrie...................... | 328/140 X |

Primary Examiner—John S. Heyman
Attorney, Agent, or Firm—Frederick W. Padden

[57] ABSTRACT

A circuit having a plurality of separate trigger circuits each being provided with the components of the signal which fall within a separate frequency band. Each trigger circuit is designed to trigger only when a signal occurs within the associated frequency band. The outputs of the trigger circuits drive an "OR" gate which in turn drives a counter. The circuit is particularly adapted for use in noisy applications where the signal level varies with frequency, such as for example with a flow meter.

7 Claims, 6 Drawing Figures

SIGNAL FREQUENCY DETECTION CIRCUIT

BACKGROUND OF THE INVENTION

This invention relates to circuits which detect or count a signal frequency in the presence of noise, particularly where the signal amplitude varies with frequency.

DESCRIPTION OF THE PRIOR ART

Frequency, period or total number of periods is usually measured by sensing with a triggering circuit the times when an input signal passes through a selected amplitude level. The number of passages of the signal through the level per second is then the frequency, and the time between passages is the period. The total number of the periods may also be counted. The usual approach is to process or prepare the input signal so that passage of the signal through a selected level (from below to above the level or vice versa) occurs precisely once per signal period and does not occur more or less often due to noise.

When the signal amplitude varies with frequency, it may be frequency compensated with a passive or active filter network that has a frequency response characteristic which is the approximate inverse of the signal frequency response characteristic, so that at the output of the compensation network the signal amplitude does not appreciably vary with frequency.

In high noise situations, however, there may be no level at which false triggers and missed triggers do not occur, even with perfect compensation, as pointed out and illustrated in U.S. Pat. No. 3,522,449 for an Automatic Filter Selector.

Although the Automatic Filter Selector described in U.S. Pat. No. 3,522,449 might work reasonably well in some high noise applications, it is limited by its own specification to use in situations where the signal to noise ratio is greater than unity. Without frequency compensation the signal to noise ratio of some input signals is much less than unity since the amplitude of a high frequency signal may be less than the amplitude of lower frequency noise. A compensation network corrects this signal to noise problem and presumably could be combined with the Automatic Filter Selector in such a situation, though it is certainly not clear whether such a combination is suggested by U.S. Pat. No. 3,522,449.

As a practical matter, however, compensation is never perfect and the signal amplitude still varies with frequency though generally to a much lesser extent. To assure adequate matching of frequency characteristics, components often must be hand selected to meet exacting tolerance requirements. In addition, the design of a practical compensation network generally requires that the signal amplitude versus frequency characteristic be known and that it does not appreciably vary. Adjustable compensation networks are complex to design, build or use. There is a need to provide accurate signal sensing in very high noise situations without requiring the use of an accurately matched frequency compensation network.

The present invention, in its various forms, is directed toward solving the same problems as the above-mentioned Automatic Filter Selector. However, the present invention does not require that the overall signal to noise ratio be greater than unity and it does not require the use of an accurately matched frequency compensation network.

SUMMARY OF THE INVENTION

It is an object of the present invention to provide an improved circuit for detecting the frequency, period or total number of periods of a signal.

It is a further object of this invention to provide an improved circuit for detecting such characteristics in the presence of noise.

Another object of this invention is to detect such characteristics in the presence of noise without requiring the use of an accurately matched frequency compensation network.

A further object of the present invention is to provide an improved circuit which will permit accurate measurement of the output of a flow meter.

Still another object of the present invention is to permit such measurement of the output of a flow meter having a thermistor probe without requiring a frequency compensation network having a frequency characteristic which is the approximate inverse of the frequency characteristic of the probe.

These and other objects, which will become apparent from the detailed disclosure and claims to follow, are achieved by the present invention which provides a method and circuit for splitting the input signal into frequency bands, for independently detecting the presence of a true signal in each of the bands with separate trigger circuits; for summing the outputs of the separate trigger circuits; and for sensing the period or frequency of the sum.

DESCRIPTION OF THE PREFERRED EMBODIMENTS

Figure 1:
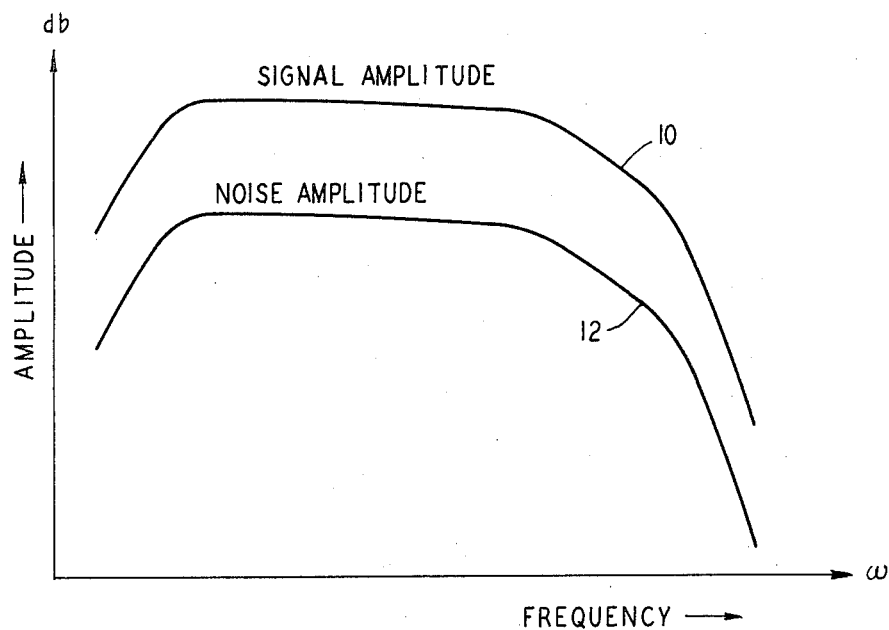
FIG. 1 shows a typical frequency response curve for an input signal and an amplitude versus frequency representation of noise typically associated with it.

In order to explain more fully one of the problems which the present invention is designed to solve, FIG. 1 shows a frequency response characteristic 10 that is typical for signals which are physically detected, for example, signals coming from a flow meter, such as the Bluff Body Flowmeter shown and described in the U.S. Pat. No. 3,572,117 assigned to the same assignee. The illustrated high frequency and low frequency roll off is generally experienced in physical systems. It is also frequently discovered that whatever physical mechanism or phenomenon produces the roll off characteristics ( a sensor probe in the case of the flow meter) also acts in the same manner upon fluid turbulent noise resulting in a noise amplitude frequency characteristic of the same shape. Although noise amplitudes are best described as probability functions, an amplitude versus frequency curve 12 may be drawn which at each frequency specifies the amplitude above which noise occurs with a negligibly low probability. For lower and lower probabilities the curve 12 shifts higher and higher.

When a very accurate and reliable signal frequency determination or period determination or count is desired, the detection circuitry should reject as much noise as possible, even noise having an amplitude that occurs very infrequently, such as the amplitudes described by the curve 12.

Figure 2:
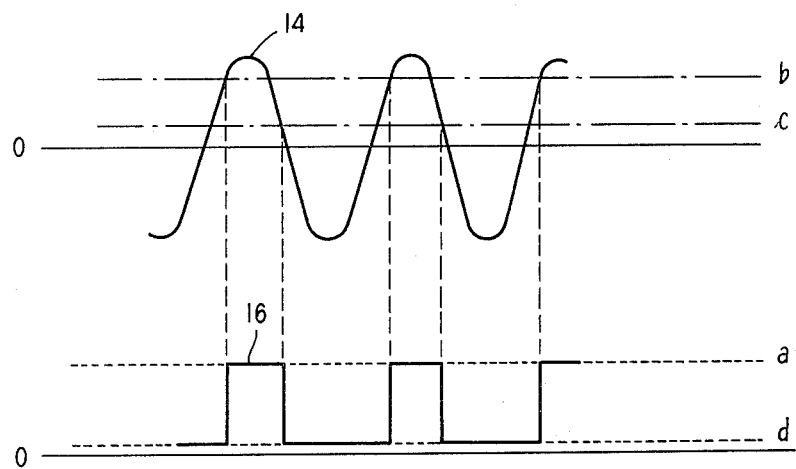
FIG. 2 illustrates level sensing of a periodic signal and shows the resulting output from a triggering circuit.

The frequency, period or total number of periods is usually measured by sensing with a triggering circuit, such as a Schmitt trigger circuit, the times when an input signal passes through a selected amplitude level. FIG. 2 shows a pure periodic input signal 14 and the output 16 of a triggering circuit responding to it. The trigger circuit turns "on" and the output goes to a high level designated by line $a$ when the input signal reaches the "on" level designated by line $b$ in the drawing. The output remains high until the input falls to the "reset" level designated by line $c$ in the drawing at which time the output signal 16 drops to a low level designated by line $d$. The output 16 remains at this level until the input signal 14 again reaches the "on" level $b$.

When high frequency noise is added to the signal 14, the noise causes the signal to vary above and below the periodic curve shown. If the total variation becomes greater than the difference between the "on" and "reset" levels the noise may cause the signal to go through one or more additional on-reset cycles and produce an extraneous count. Low frequency noise, on the other hand, may slowly displace the signal downward until the signal fails to reach the "on" level for one or more cycles resulting in missed triggering or counts. These situations are shown and described in U.S. Pat. No. 3,522,449.

Analysis of the foregoing reveals that the "on" level should generally be located at a level which is, at any relevant frequency, displaced below the signal amplitude curve by an amount exceeding the peak amplitude of any noise components below that frequency. At the same time, the "on" level must be located at a level above the highest peak amplitude noise components. The "reset" level generally should be displaced below the "on" level by an amount exceeding the peak to peak amplitude of any noise components.

Referring again to FIG. 1, it is apparent that no horizontal line can be drawn representing an "on" level which is at all points below curve 10 and above curve 12. Compensation networks flatten the curves 10 and 12 so that it becomes possible to select an "on" level that meets the above requirements. An ideal compensation network would convert curves 10 and 12 into horizontal lines making it a simple matter to select an "on" level that is properly displaced below curve 10 and above curve 12.

According to the method of this invention, however, it is not necessary to flatten the curves with a compensation network. Instead, the curves are divided into frequency portions or bands and a separate "on" level is selected for each band, in accordance with the above described rules. The maximum width of a band depends upon the amount of separation between the curves in that region and the slope or amount of vertical change in the curves in that region.

Figure 3:
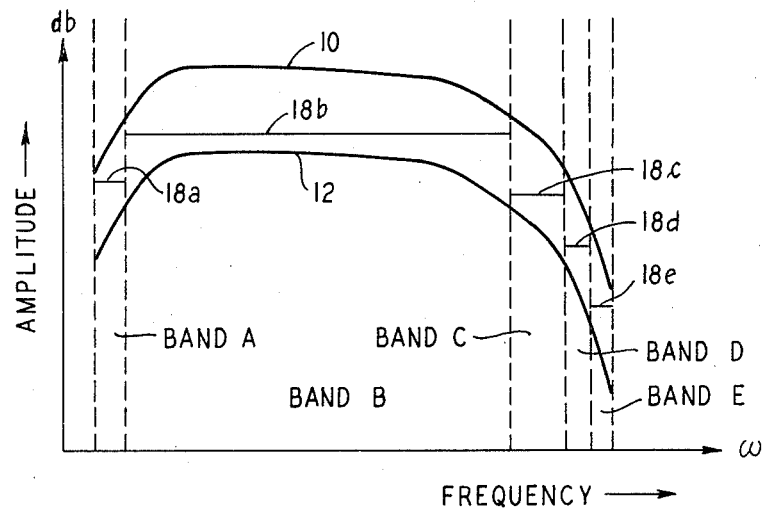
FIG. 3 applies the present invention to the curves of FIG. 1 and illustrates the frequency bands and triggering levels.

FIG. 3 applies this procedure to the curves in FIG. 1. Five bands A through E are shown but more or less than five bands could be used. Lines $18a-e$ represent the "on" levels for the bands A through E respectively.

Figure 4:
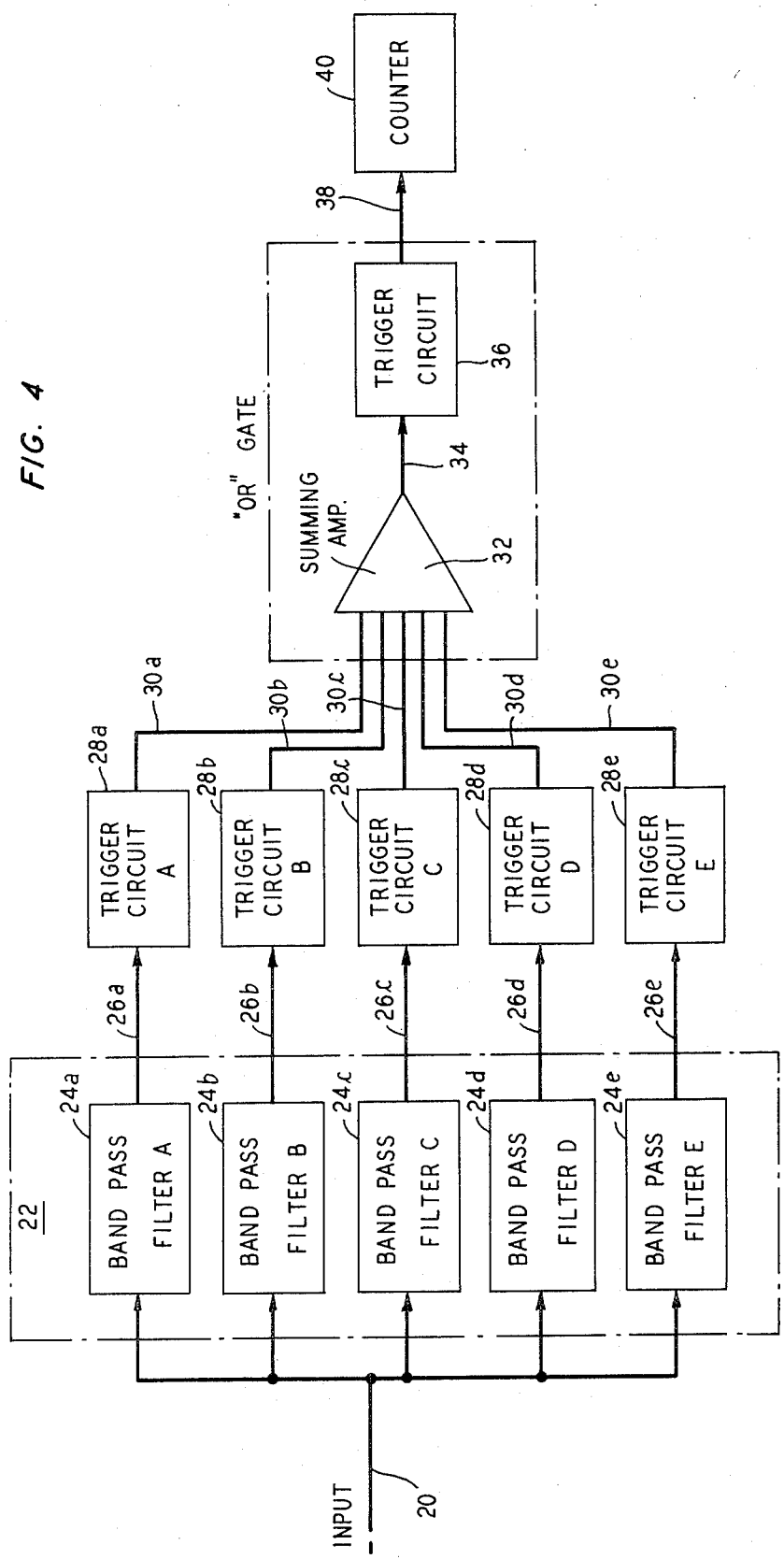
FIG. 4 is a functional block diagram of the present invention.

FIG. 4 is a functional block diagram of the basic invention. An input signal is presented on line 20 to a Filter Network 22, the function of which is to divide the input signal into frequency bands. Five Band Pass Filters $24a-e$ are shown as constituting the Filter Network 22 but it should be understood that any network which divides a signal into frequency band components would likewise be suitable. Any frequency of interest must be covered by one of the bands but the bands need not be mutually exclusive as will later become more apparent. That is, the bands may overlap. The amount of attenuation through each band pass filter may also vary without detrimental consequences. Obviously, the number of bands may be greater or smaller than five.

The separate frequency band components of the input signal are presented via lines $26a-e$ respectively to Trigger Circuits $28a-e$ respectively as shown. In general, the trigger circuits have different "on" and "reset" levels from one another in accordance with the triggering requirements of each band pass channel. The "on" level of Trigger Circuit $28a$, for example, is selected in accordance with the triggering requirements imposed by the signal and noise amplitude characteristics for Band A. If FIG. 3 represents the signal and noise characteristics and the band selections, the "on" level for Trigger Circuit $28a$ might, for example, be represented as line $18a$ in FIG. 3. As would be apparent to one skilled in this field, the gain or attenuation through Band Pass Filter $24a$ will raise or lower the actual "on" level accordingly. Obviously, gain or attenuation may be inserted or removed anywhere along the signal paths so long as the triggering levels of the Trigger Circuits are adjusted accordingly. Conversely, the triggering levels of all the triggers might be the same if appropriate gain or attenuation functions are performed beforehand.

Each of the Trigger Circuits $28a-e$ will have an output waveform similar in shape to the curve 16 shown in FIG. 2. The frequency will, of course, be determined by the input signal frequency. In general, only one of the Trigger Circuits will be producing such a waveform since the signal being detected presumably has a frequency which is being passed by only one Band Pass Filter. Noise components diverted by Filter Network 22 to other Trigger Circuits would not cause these Trigger Circuits to turn "on" because the "on" levels are selected above the highest amplitude noise within that band. It is possible and anticipated, however, that two adjacent bands may both pass a signal, particularly if the bands overlap, and cause triggering in two Trigger Circuits.

The output signals from Trigger Circuits $28a-e$ are presented via lines $30a-e$ respectively to a Summing Amplifier 32. Trigger Circuit 36 receives the output signal from Summing Amplifier 32 on line 34 and drives via line 38 a Counter 40 or other similar device which measures the frequency, period or total number of periods. Trigger Circuit 36 might be part of the Counter 40 since it functions merely as a threshold device. Trigger Circuit 36 is triggered whenever the signal 34 goes to a level which indicates that at least one of the Trigger Circuits 28a–e is in the "on" state. It does not trigger again until all Trigger Circuits 28a–e are in the "off" or "reset" state followed by one of the Circuits 28a–e turning "on" again. As indicated in FIG. 4, the Summing Amplifier 32 and Trigger Circuit 36 are together equivalent to a digital "OR" gate, providing, of course, that the output level of each of the Trigger Circuits 28a–e is sufficient to drive the "OR" gate. If two of the Trigger Circuits 28a–e trigger on the same waveform, one of the outputs 30a–e will go to a high value before the other. However, this will not cause a false count or a double count since the other output will rise before the first one falls.

Figure 5:
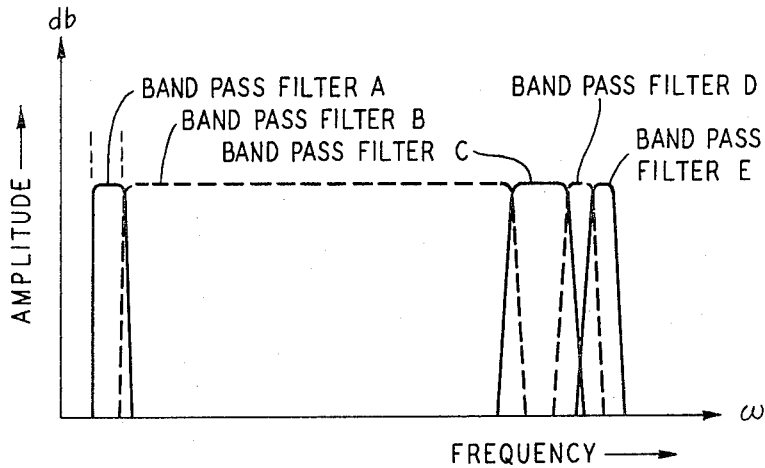
FIG. 5 shows an illustrative set of band pass filter frequency responses suitable for use with the example shown in FIG. 3.
Figure 6:
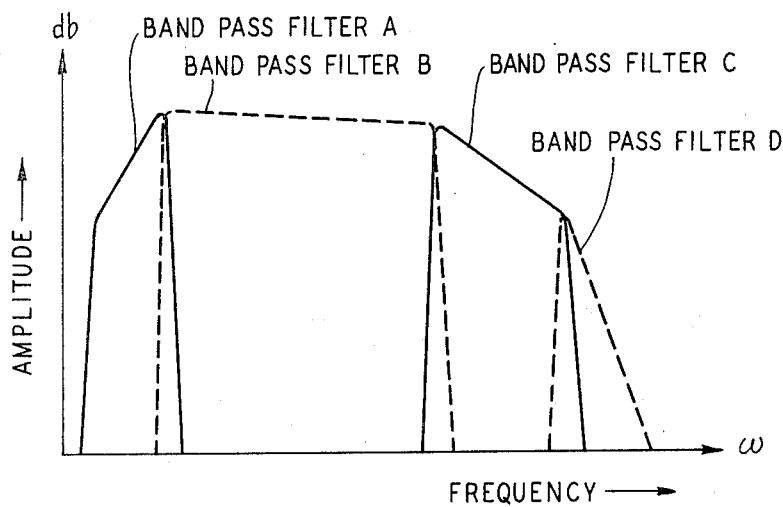
FIG. 6 shows another possible set of band pass filter frequency responses illustrative of frequency compensation which is suitable for use with the example shown in FIG. 3.

Many variations of the above concepts will be immediately apparent. For example, the Band Pass Filters 24a–e need not have the flat frequency responses shown in FIG. 5. If anything is known about the frequency response curve of the input, it is possible and perhaps desirable to provide frequency compensation separately to each band as shown in FIG. 6. Frequency compensation could also be provided for the entire range at an input stage preceding the Filter Network 22. The overall advantages gained by splitting the signal are still retained. If the frequency response of the signal varies with time, location, particular units, etc., adjustment of triggering levels or gains will result in proper operation. The important point is that the frequency response of compensation networks and detection devices such as flowmeter probes need not be accurately controlled or adjusted since final adjustment is made by changing triggering levels, not by changing the frequency responses of compensation networks or by selecting probes with more desirable frequency responses. It is apparent that if an average frequency response for the input signal can be determined, compensation for that response can and perhaps should be provided either in the Filter network 22 or beforehand since the deviation from the average frequency response which can be tolerated by the system for any selected number of bands will increase. Whether the cost of providing some frequency compensation is less than the cost of increasing the number of bands is an entirely separate matter.

As would also be apparent to those skilled in the art, when bands are sufficiently narrow, noise variations within the band would not change the direction in which a true signal is moving. When this is the case, there is no need to provide two separate threshold levels in the associated triggering circuits. A conventional single level triggering or sensing circuit would therefore be sufficient in place of the Schmitt trigger type circuit described above.

Although the above description is directed to preferred embodiments of the invention, it is noted that additional variations and modifications will be apparent to those skilled in the art and, therefore, may be made without departing from the spirit and scope of the present disclosure.

What is claimed is:

1. A circuit for processing a fluid flow signal, comprising:
    a filter network for dividing said signal into a plurality of frequency band components;
    a plurality of trigger circuits, each of said trigger circuits being responsive to the divided signal for monitoring an individual one of said frequency band components and including means defining a selectively different change of state threshold level for said each of said trigger circuits;
    each one of said trigger circuits being responsive to the monitored individual one of said frequency components above the threshold level for said one of said trigger circuits for producing an output signal;
    means responsive to each said output signal for indicating the number of distinct times during which at least one of the periods of said fluid flow signal occurs;
    whereby said number of distinct times is a measure of the frequency of said signal.

2. A circuit as recited in claim 1, wherein said filter network comprises a plurality of band pass filters.

3. A circuit as recited in claim 2, wherein at least one of said band pass filters comprises means defining a sloping frequency response characteristic over the frequency band transmitted.

4. A circuit as recited in claim 1, wherein said indicating means includes a summing amplifier and a trigger circuit.

5. A circuit as recited in claim 4, wherein said indicating means further includes a counter.

6. A circuit as recited in claim 1, wherein said defining means in each one of said trigger circuits comprises means establishing the respective change of state threshold level greater than the expected noise amplitudes within said monitored frequency band component and less than expected fluid flow signal amplitudes within said monitored frequency component.

7. A method for detecting the frequency of a signal, comprising the steps of:
    dividing said signal into a plurality of frequency band components;
    detecting at different threshold levels the periods during which the amplitude of said frequency band components is above a said threshold level; and
    counting the number of distinct times during which at least one of said periods has been detected;
    whereby said number of distinct times is a measure of the frequency of said signal.

* * * * *

Disclaimer 3,805,171.—*Ronald L. Drumheller*, New York, N.Y. SIGNAL FREQUENCY DETECTION CIRCUIT. Patent dated Apr. 16, 1974. Disclaimer filed June 24, 1974, by the assignee, *Eastech, Inc.*

Hereby enters this disclaimer to claim 7 of said patent.

[*Official Gazette August 13, 1974.*]